(12) United States Patent
Dutta et al.

(10) Patent No.: US 7,711,750 B1
(45) Date of Patent: May 4, 2010

(54) SYSTEMS AND METHODS THAT SPECIFY ROW LEVEL DATABASE SECURITY

(75) Inventors: Tanmoy Dutta, Sammamish, WA (US); Girish Chander, Redmond, WA (US); James R. Hamilton, Bellevue, WA (US); Alain C. Comeau, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 10/903,338

(22) Filed: Jul. 30, 2004

Related U.S. Application Data

(60) Provisional application No. 60/543,855, filed on Feb. 11, 2004.

(51) Int. Cl.
*G06F 7/00* (2006.01)
*G06F 17/30* (2006.01)

(52) U.S. Cl. .............................. 707/784; 703/999.003; 703/999.009

(58) Field of Classification Search ..................... 707/1, 707/3, 9
See application file for complete search history.

(56) References Cited

U.S. PATENT DOCUMENTS

| | | | |
|---|---|---|---|
| 5,261,102 A | 11/1993 | Hoffman | |
| 5,414,834 A | 5/1995 | Alexander et al. | |
| 5,734,887 A | 3/1998 | Kingberg et al. | |
| 5,787,428 A * | 7/1998 | Hart | 707/9 |
| 5,911,143 A | 6/1999 | Deinhart et al. | |
| 5,941,947 A | 8/1999 | Brown et al. | |
| 5,943,671 A | 8/1999 | Kleewein et al. | |
| 5,956,715 A | 9/1999 | Glasser et al. | |
| 6,308,173 B1 | 10/2001 | Glasser et al. | |
| 6,397,206 B1 | 5/2002 | Hill et al. | |
| 6,405,212 B1 | 6/2002 | Samu et al. | |
| 6,412,070 B1 | 6/2002 | Van Dyke et al. | |
| 6,658,407 B1 | 12/2003 | Bailey | |
| 6,715,081 B1 | 3/2004 | Attwood et al. | |
| 6,820,082 B1 * | 11/2004 | Cook et al. | 707/9 |
| 6,836,770 B2 | 12/2004 | Gonnet | |
| 7,346,617 B2 * | 3/2008 | Wong | 707/9 |
| 2002/0147714 A1 | 10/2002 | Koo et al. | |

(Continued)

OTHER PUBLICATIONS

Ueli Maurer, The Role of Cryptography in Database Security, SIGMOD 2004, Jun. 13-18, 2004, 6 pages, ACM.

(Continued)

*Primary Examiner*—Sathyanarayan Pannala
(74) *Attorney, Agent, or Firm*—Workman Nydegger

(57) ABSTRACT

The present invention specifies database security at a row level and, optionally, at a column and table level. The systems and methods cluster one or more sets of rows with similar security characteristics and treat them as a named expression, wherein clustered data is accessed based on associated row-level security. The systems and methods specify a syntax that invokes row(s), column(s) and/or table(s) security via programming statements. Such statements include arbitrary Boolean expressions (predicates) defined over, but not restricted to table columns and/or other contextual data. These statements typically are associated with query initiators, incorporated into queries therefrom, and utilized while querying data. Rows of data that return "true" when evaluated against an aggregate of associated security expressions are said to "satisfy" the security expressions and enable access to the data stored therein. Such security expressions can be created and invoked via the Structured Query Language (SQL) database programming language.

25 Claims, 12 Drawing Sheets

U.S. PATENT DOCUMENTS

| | | | |
|---|---|---|---|
| 2003/0014394 A1* | 1/2003 | Fujiwara et al. | 707/3 |
| 2004/0044655 A1 | 3/2004 | Cotner et al. | |
| 2004/0068661 A1* | 4/2004 | Dettinger et al. | 713/200 |
| 2004/0073565 A1 | 4/2004 | Kaufman et al. | |
| 2004/0139043 A1* | 7/2004 | Lei et al. | 707/1 |
| 2004/0158551 A1 | 8/2004 | Santosuosso | |
| 2005/0071143 A1 | 3/2005 | Tran et al. | |
| 2005/0273854 A1 | 12/2005 | Chess et al. | |

OTHER PUBLICATIONS

Marianne Winslett, et al., Formal Query Languages for Secure Relational Databases, ACM Transactions on Database Systems, 1994, pp. 626-662, vol. 19 No. 4.

Sushil Jajodia, Database Security and Privacy, ACM Computing Surveys, Mar. 1996, pp. 129-131, vol. 28 No. 1, CRC Press.

Gottfried Vossen, et al., An Extension of the Database Language SQL to Capture More Relational Concepts, SIGMOD Record, Dec. 1988, pp. 70-78, vol. 17 No. 4.

Ramzi A. Haraty, C2 Secure Database Management Systems—A Comparative Study, SAC '99, 1998, pp. 216-220, ACM, San Antonio, Texas.

Shariq Rizvi, et al., Extending Query Rewriting Techniques for Fine-Grained Access Control, SIGMOD 2004, Jun. 13-18, 2004, 12 pages, ACM.

Tor Didriksen, Rule Based Database Access Control—A Practical Approach, RBAC '97, 1997, pp. 143-151, ACM.

Torsten Priebe, et al., Towards OLAP Security Design—Survey and Research Issues, DOLAP '00, 2000, pp. 33-41, ACM, McLean, VA, USA.

Andrew Eisenberg, et al., SQL:1999, Formerly Known as SQL3, SIGMOD Record, Mar. 1999, pp. 131-138, vol. 28 No. 1.

G. Widerhold, et al., Web Implementation of a Security Mediator for Medical Databases, Database Security XI: Status and Prospects, pp. 60-72, 1998.

W.Eβmayr, et al., The Security Architecture of IRO-DB, In Proc. of the 12th IFIP International Conference on Information Security, IFIP/SEC 1996, 12 pages.

T. Marius Truta, et al., Privacy and Confidentiality Management for the Microaggregation Disclosure Control Method: Disclosure Risk and Information Loss Measures, ACM Workshop on Privacy in the Electronic Society, pp. 21-30, 2003.

C. Anticoli European Search Report, Munich, Germany. June 3, 2005. 2 pages.

Vorwerk, et al., On Implicate Discovery and Query Optimization. IEEE: Proceedings of International Database Engineering and Application Symposium: 2002, http://ieeexplore.ieee.org/iel5/7997/122119/01029651.pdf?arnumber=1029651, last accessed on Jan. 27, 2009, 10 pages.

OA dated Nov. 10, 2008 for U.S. Appl. No. 10/885,815, pp. 28.

OA dated Dec. 17, 2008 for European Application Serial No. 05 000 405.0-2224, 5 pages.

* cited by examiner

SYSTEMS AND METHODS THAT SPECIFY ROW LEVEL DATABASE SECURITY

CROSS-REFERENCE TO RELATED APPLICATION(S)

This application claims the benefit of U.S. Provisional Patent Application Ser. No. 60/543,855 filed on Feb. 11, 2004 and entitled "SYSTEMS AND METHODS THAT PROVIDE ROW LEVEL SECURITY FOR DATABASE TABLE ROW." This application also is related to co-pending U.S. patent application Ser. No. 10/885,815 filed on Jul. 7, 2004 and entitled "SYSTEMS AND METHODS THAT OPTIMIZE ROW LEVEL DATABASE SECURITY." The entireties of these applications are incorporated herein by reference.

TECHNICAL FIELD

The present invention generally relates to databases, and more particularly to systems and methods that specify row level security for databases.

BACKGROUND OF THE INVENTION

Technological advances in computer hardware, software and networking have lead to increased demand for electronic information exchange rather than through conventional techniques such as paper and telephone correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes more important to store such data in a manageable manner that facilitates user-friendly and quick data searches and retrieval. Today, a common approach is to store electronic data in one or more databases. In general, a typical database is an organized collection of information structured such that a computer program, for example, can quickly search and select data. Traditionally, data stored within a database is organized via one or more tables, wherein respective tables comprise sets of records and a record comprises a set of fields. Records are commonly indexed as rows within a table and the record fields are commonly indexed as columns such that a row/column pair can reference particular datum within a table.

Data stored in a database often includes personal (e.g., bank account and social security numbers) and sensitive information (e.g., medical records) and may not be backed-up via hard copies. Therefore, security related to databases and data stored therein is growing in importance. However, many of today's database security techniques can be breached, for example, through software holes and/or by software hackers with malicious intent, or do not provide a comprehensive level of security.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides systems and methods that specify row-level database security. In general, a typical database stores data in a structured format, wherein a set of entities with similar structure can be grouped as a table, respective entities can be grouped as records, or table rows, and respective rows can include one or more fields, or columns. Data stored in a database table can be accessed utilizing essentially any database processing language, such as, for example, SQL (Structured Query Language). For example, SQL can be utilized to specify one or more tables as a source of data such that a query is performed over the specified table(s) and returned data comprises data from this table(s).

The systems and methods of the present invention facilitate database table row-level security by providing enhanced syntax that can be utilized to create named expressions defined over but not restricted to table columns and/or contextual data. Security at the row level provides for clustering one or more sets of rows with similar security characteristics. Such security can provide advantages with databases (e.g., relational) that enable a user to perform associative queries over tables, wherein queries can be structured based on access paths and/or indices present on the table rows.

The named expressions can be referred to as security expressions and can include predicates, represented as arbitrary Boolean expressions, which must be satisfied by a row of data in order for the data to be made accessible to a query initiator. One or more such expressions can be created for one or more rows of data and associated with one or more query initiators. Thus, in one instance, a row of data can be evaluated against a plurality of security expressions and, in another instance, individual rows can be evaluated with the same security expression. In addition, the syntax provides for concurrently invoking column and/or table level security such that powerful and comprehensive security can be efficiently established.

When row level security is activated, a query initiator that is not associated with at least one security expression will not be able to access any data that is associated with a security expression. However, a query initiator who is associated with at least one security expression can access the associated data if the data satisfies the security expression. In general, satisfying a security expression can mean that the row of data evaluates to "true" against the security expression, and a row of data that does not evaluate to "true," but instead evaluates to "false," is hidden, or made unavailable to the query initiator.

Security expressions can be associated with a query initiator through a database language such as SQL. For example, security expressions can be created using an SQL CREATE utility. Created security expressions can be associated with a query initiator through SQL GRANT and DENY utilities. A grant and/or deny security expression can be revoked through an SQL REVOKE utility or dropped through an SQL DROP utility. Such security expressions typically are incorporated into a query and utilized when querying the data. In general, a granted security expression is one that provides access to a row of data when the row satisfies the security expression and a deny security expression is one that prohibits access to a row of data when the row satisfies the security expression. As noted above, a plurality of security expressions can be associated with a query initiator; thus, both grant and deny security expressions can be associated with a user. Typically, a deny security expression supersedes a grant such that a row that satisfies both types of security expressions is not made available to the query initiator. In addition, the complement of deny security expression can be utilized such that an aggregate result from evaluating a row of data with a plurality of security expressions renders a "true" when at least one grant security expression is satisfied and no deny security expressions are satisfied.

Conventionally, in order to associate security with a row, respective rows needed to be identified. However, many database programming languages do not account for identifying respective rows in a table with an address. In some cases, a primary key can be utilized as an address for a table. However, not every table has an associated primary key. Furthermore, associating security such that respective rows in a table can be individually identified can lead to data management problems since there may be a large number of rows in a table. Moreover, storing security information within respective rows can be inefficient and consume space, especially if the values stored in respective rows are not very large. In addition, many database programming languages prescribe a syntax by which security can be specified on a table or one or more of its constituent columns, but not on respective rows. The novel systems and methods of the present invention can be utilized to mitigate the aforementioned shortcoming through enhanced SQL syntax.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
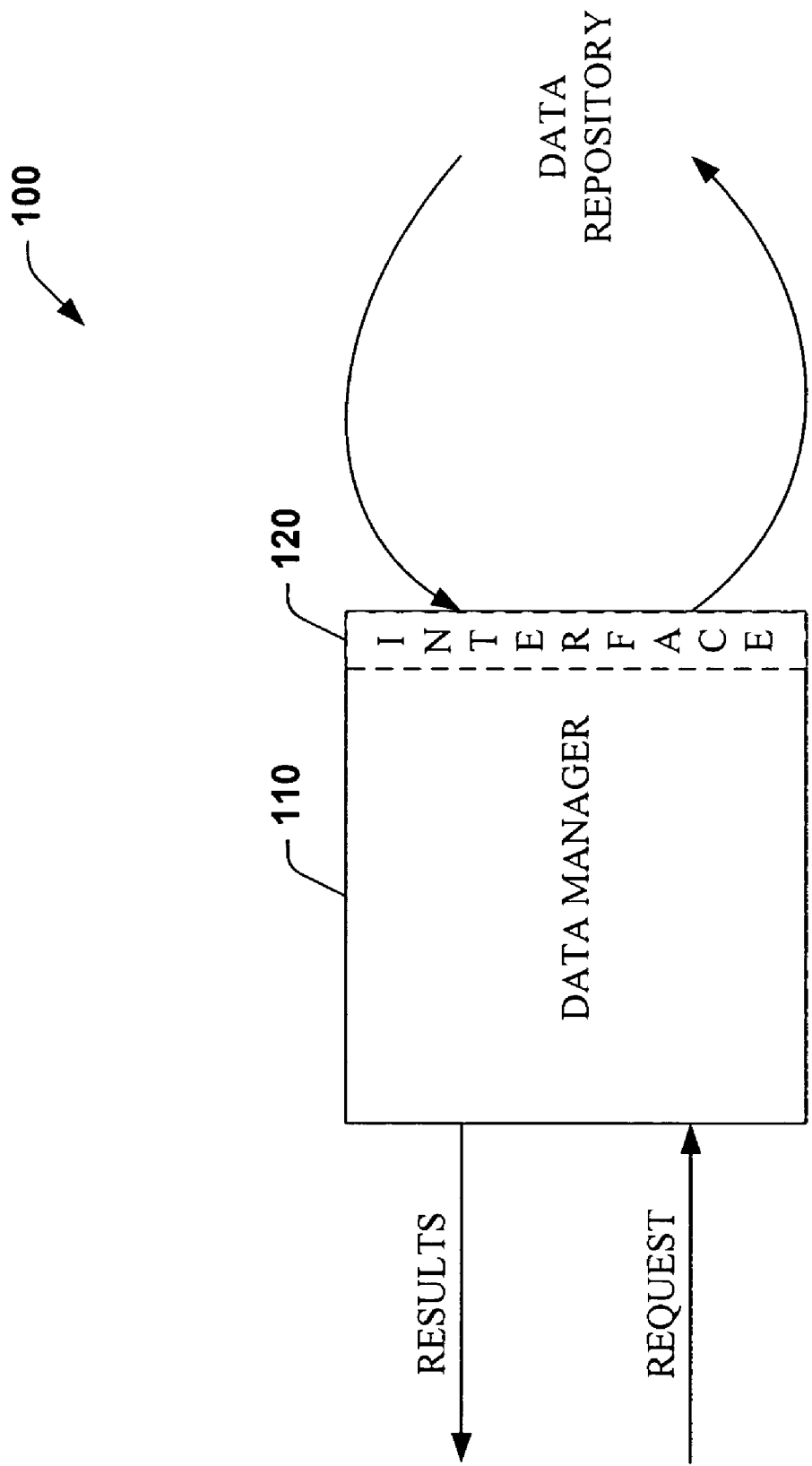
FIG. 1 illustrates an exemplary data security system.

As used in this application, the terms "component," "system," "manager," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention relates to systems and methods that specify database security at the row, column and/or table level. Such security enables one or more sets of rows with similar security characteristics from one or more tables to be clustered and treated as a named expression (e.g., a security expression), which acts as a surrogate for all rows that satisfy that expression. Thus, a security expression can be created to satisfy multiple rows from multiple tables. In addition, a plurality of security expressions can be created to satisfy one or more rows from one or more tables. The foregoing provides for security advantages with databases that enable a user to perform associative queries over one or more tables, wherein such queries can be improved based on access paths and/or indices present on the table rows.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a data security system 100 that comprises a data manager 110 and an interface component 120. The data manager 110 receives requests (e.g., queries) for data and facilitates data retrieval from a data repository (e.g., database(s), table(s), contextual information . . . ) based on security criteria. The security criteria can be, for example, one or more security expressions that have to be satisfied in order to gain access to the data. It is to be appreciated that when more than one security expression is associated with request, respective security expressions can be aggregated and serially or concurrently evaluated, wherein respective results are combined to render a decision. In other aspects of the present invention, individual results can be analyzed and a decision can be determined therefrom.

Typically, the data manager 110 applies the security criteria while retrieving requested data from the data repository. However, it is to be appreciated that the security criteria can be applied prior to or after retrieving data. For example, the security criteria can be applied to determine the available data and then such data can be retrieved. In another example, all requested data can be retrieved and then this set of data can be reduced to a set accessible to the requester based on the security criteria. When applied during data retrieval, respective data in the data repository can be evaluated against the security criteria while performing a query over the data in order to determine whether the data satisfies the security criteria. If the data (e.g., all, a subset thereof and none) satisfies the security criteria, the data can be made available to the requester, for example, such that the requester can view, download and/or manipulate the data. If the data (e.g., all, a subset thereof and none) does not satisfy the security expression, the data can be hidden from the requester. In addition, where at least one security expression has not been linked to a user for a particular set of data, that data can be hidden from the requester since a security expression cannot be satisfied.

It is to be appreciated that an owner of data (e.g., a table administrator, an application administrator . . . ) can create security criteria for their respective data in order to provide selective access to their data. Such criteria can be predefined and/or generated in real-time and associated by the owner with one or more requesters (e.g., users, groups, domains, networks . . . ). In addition, the owner can change, revoke, remove, etc. the security criteria provided to a requester. Moreover, security can be deactivated such that none or all of the owner's data is made available to the requester.

The data repository can include essentially any medium that can store data, and the data manager 110 can communicate with the data repository through the interface component 120. The interface component 120 can include multiple interfaces, software, firmware, drivers, ports, access points, etc. to accommodate virtually any data repository. In addition, the interface component 120 can communicate with the data repository through hardwired (e.g., bus and network) or wireless (e.g., RF, optical, IR . . . ) communications and in a half or full duplex manner.

As noted above, when data satisfies the security criteria, the data manager 110 can provide the data to the requester. For example, the data can be displayed to the requester(s), wherein the requester(s) can perform subsequent operations such as add, modify, delete, copy, sort, lock, move, update, etc. In another example, a copy of the data can be provided to any requester. When data does not satisfy the security criteria or security criteria has not been created for the requester, such data typically is hidden and rendered unavailable to the requester.

Figure 2:
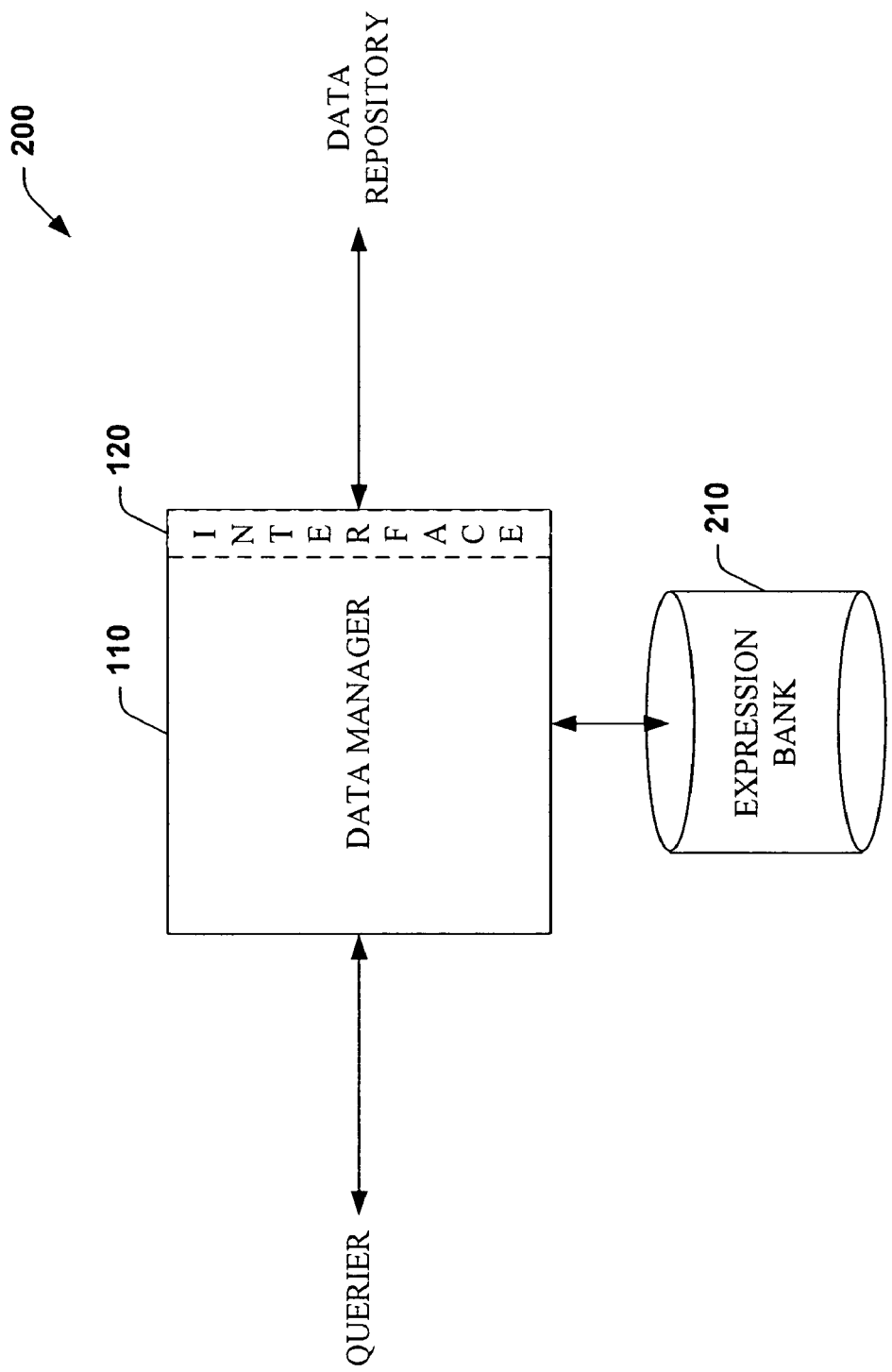
FIG. 2 illustrates an exemplary data security system that utilizes stored security expressions to provide data security for a data repository.

FIG. 2 illustrates a data security system 200 with the data manager 110, the interface component 120, and an expression bank 210. As noted above, the data manager 110 receives requests for data and returns data that satisfies security criteria. Such requests can be from one or more queriers, received serially and/or concurrently, and can be associated with similar and/or disparate data within the data repository. In addition, multiple queries can be handled serially and/or concurrently. In many instances, memory such as a buffer (not shown) can be utilized by the data manager 110 to temporarily store information related to one or more queries. For example, a query tagged as high priority can be handled prior to a lower priority query, wherein the lower priority requests can be cached until the higher priority query is serviced.

The security criteria can be represented in the form of a security expression or one or more Boolean expressions (e.g., predicates) that evaluate to a binary value such as "true" and "false," or "1" and "0," wherein "true" and "1" typically (but not always) are defined to indicate security clearance and "false" and "0" typically (but not always) are defined to restrict access. In some instances, the complement is utilized. For example, when the creator of an expression desires "true" or "1" to restrict access and "false" or "0" to allow access. When multiple Boolean expressions are utilized, respective expressions can be serially or concurrently evaluated as one security expression, wherein results are aggregated (e.g., ANDed and ORed together) to render a decision as to whether the data satisfies security and is available to the querier. Individual expressions can be created that expressly allow (e.g., grant) or prohibit (e.g., deny) access to data when satisfied. Since satisfying a data prohibiting such expression results in a "true," the complement can be utilized so that satisfying such expression results in "false." Thus, an aggregated expression can be created that returns "true" when at least one grant expression is satisfied and no deny expressions evaluate to "true." It is to be appreciated that the term security expression as utilized hereafter can refer to individual Boolean expressions or aggregated Boolean expressions, including an aggregate of one expression. In addition, although Boolean expressions can be employed, as noted above, other techniques can be utilized in accordance with an aspect of the present invention. Such techniques may be able to provide more than a binary decision such as a probability and/or confidence level, wherein an adjustable threshold is utilized to set a cut-off point.

The expression bank 210 can be utilized to store security expressions. As noted previously, such expressions can be created by one or more owners of data for one or more rows, columns and/or tables of data and associated with one or more queriers and/or groups of queriers. Such security expressions can be retrieved from the expression bank 210 upon identifying a querier. For example, a received query may include a unique identifier associated with the querier (e.g., a user, an application . . . ) or the machine that transmitted the query. In another instance, the query may be prefaced and/or followed by such information. In still other instances, intelligence can be employed to determine the querier and/or a suitable set of security expressions. After retrieving data that satisfies a security expression, the data manager 110 can provide the data to the requester as describe herein.

Figure 3:
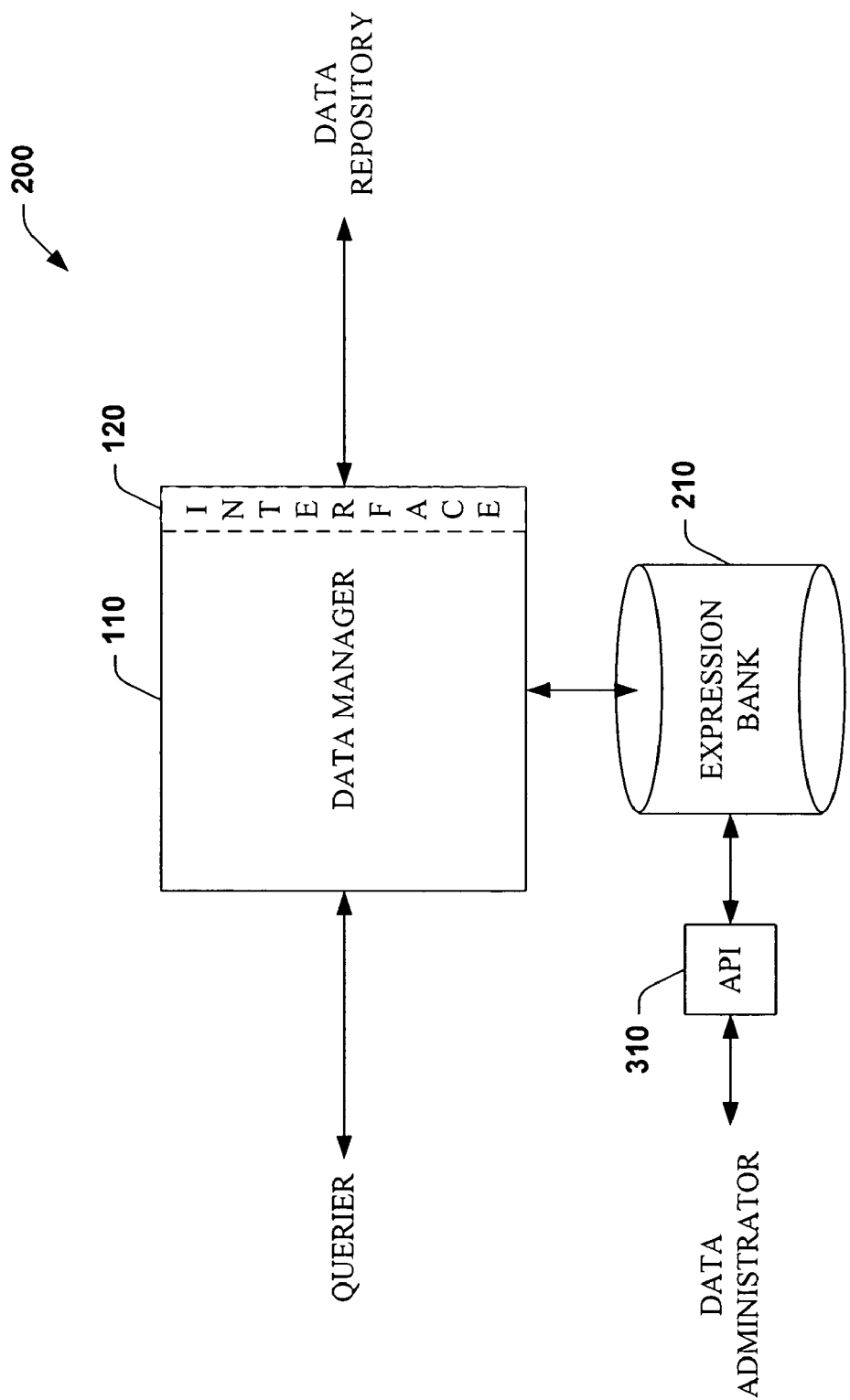
FIG. 3 illustrates an exemplary data security system that provides an interface to create and store security expressions.

FIG. 3 illustrates the exemplary system 200 that further includes an Application Program Interface (API) 310. As depicted, the API 310 is coupled to the expression bank 210. However, it is to be appreciated that other configurations can be employed in accordance with an aspect of the present invention. For example, the API 310 can additionally or alternatively be coupled to data manager 110, or other components can reside between the API 310 and the expression bank 210. Regardless of the approach, the API 310 provides a mechanism for an administrator of data in the data repository to create and store security expressions for their data and associate the security expressions with users.

By way of example, the CREATE utility in the SQL programming language can be utilized to create a security expression. For example, the following syntax can be utilized to create a security expression:

CREATE EXPRESSION <expression_name> ON <data_name> AS (<expression>), wherein EXRESSION designates an expression is being created, <expression_name> specifies the name of the expression, <data_name> specifies a source data (e.g., one or more table name or subset thereof), and <expression> is the security expression which must be satisfied by a row(s) in order to gain access to the data within the row(s). As noted above, such expressions can be linked to particular requesters and/or groups of requesters. For example, when utilizing SQL, data administrators can link a created security expression for a particular source of data to a user and/or group of users via the GRANT and DENY utilities and/or remove a security expression via the DROP and REVOKE utility, as describe in detail below.

Utilizing a multi-tier approach, for example, at the requester level and the group level, can provide for selective discrimination at different levels within a security hierarchy. Thus, a top-level administrator can create a security expression for their data and grant the expression to a group of users, wherein any data that satisfies the security expression can be deemed accessible to the users. However, the group administrator may determine to widen or narrow data access or restrict the data from particular group members. For example, the group administer can add expressions that provide access to the data when the data satisfies such expressions and/or expressions that prohibit access to the data when the data satisfies such expressions. In yet another example, the group administrator can modify the security expression by removing expressions and/or revoking expressions.

Figure 4:
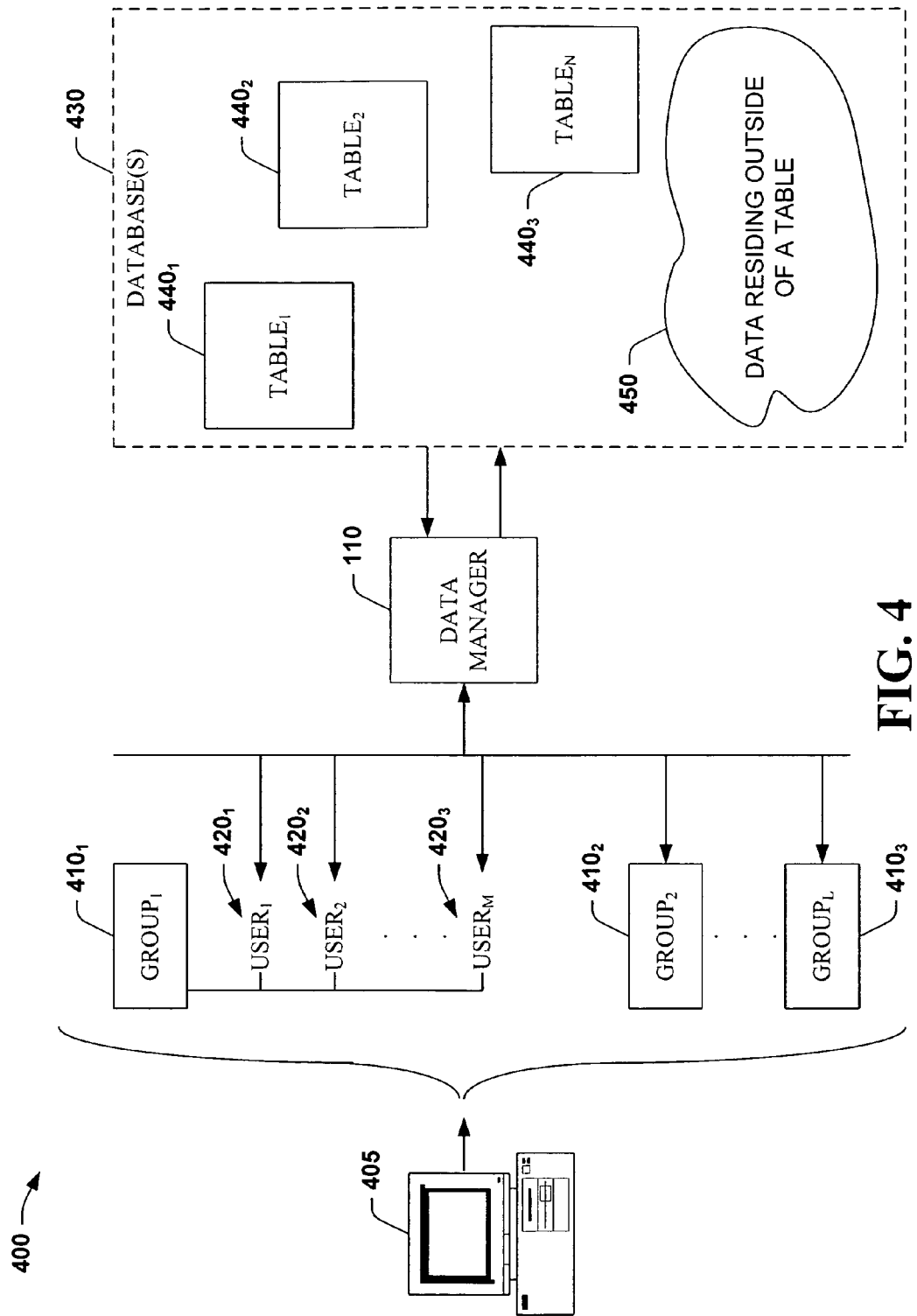
FIG. 4 illustrates an exemplary system that facilitates row-level database security through one or more security expressions.

FIG. 4 illustrates a system 400 that facilitates database security. The system 400 includes a user access point 405 to a database. As depicted, the user access 405 is a desktop computer. However, it can be appreciated that any microprocessor-based device such as a portable computer (e.g., a laptop, a tablet PC . . . ), a hand held computer (e.g. a PDA), a workstation, a cell phone, etc. can be employed in accordance with an aspect of the present invention.

In many instances, user access point 405 is coupled to a sub-network/bus within a larger network/bus (e.g., plant or corporation wide), wherein users with an account within the sub-network/bus can login and access entities and applications residing therein, within the scope of privileges (e.g., rights, properties . . . ) afforded to the user. Typically, a finer level of discrimination is utilized, wherein users associated with a network are delineated into domains, groups, projects, job descriptions, workgroups, divisions, departments, status, etc., each of which can be associated with different privileges. In addition, users within a similar delineation can be associated with different privileges. For example, a plurality of users can be grouped together and one of the users can be granted supervisor status over the remaining user. Such a user commonly has privileges over the other users. For instance, the supervisor can modify another's users read, write and execute privileges, ability to view particular information and/or Internet capabilities.

In the present example, users are delineated into L such groups, wherein L is an integer equal to or greater than one. The L groups comprise a $group_1$ $410_1$, a $group_2$ $410_2$, through a $group_L$ $410_3$, which can be collectively referred to as groups 410. The groups 410 can include different and/or similar users. Thus, a particular user can be associated with multiple groups. The $group_1$ $410_1$ is shown to include M users, wherein M is an integer equal to or greater than one. The M users comprise a $user_1$ $420_1$, a $user_2$ $420_2$, through a $user_M$ $420_3$. Such users can be collectively referred to as users 420. When one of the users 420 logins to the access point 405, a user identity (e.g. unique ID, alias . . . ), group name, domain name, workgroup, etc. can be determined and utilized to configure the environment for the user. Such configuration can include executing a customized interface, hiding data, revealing data, setting read, write and/or execute privileges, etc.

This user can communicate with a database(s) 430 through the data manager 110. For example, when transmitting a query the query can be received by the data manager 110. The data manager 110 can utilize the user identity, group name, domain name, workgroup, etc. to apply suitable security over requested data. As noted above, such security can include one or more security expressions comprised of one or more Boolean expressions that enable data access when the data satisfies an expression and mitigates data access when the data does not satisfy the expression. In addition, multiple expressions and complements thereof can be ANDed and/or ORed together to form an aggregated logical security expression such that the data has to satisfy at least one data access expression and no data prohibiting expressions to satisfy the aggregated expression.

It is to be appreciated that a security expression for data in the database 430 can be created by the owner or manager of the data and linked to one or more users. This link can be established as an outcome of a direct grant to the user or indirectly to the user through a grant to one or more user roles, servers, groups, etc. By way of example, a table can be defined as:

Emp(id int, salary float), wherein Emp is the table name, id is a variable of type integer and salary is a variable of type float. An expression for the table can be created through an SQL Create expression. For example, the following can be executed to create an expression for this table:

CREATE EXPRESSION SalLimit ON Emp AS (salary <Y), wherein SalLimit is the expression name, salary is the field to test, and Y (e.g., 100000) is a parameter that determines whether the row data satisfies the security expression. It is noted that various other statements such as denial and/or revocation statements can be similarly employed via corresponding expressions.

The SalLimit security expression can be linked to a user through the following grant expression syntax:

GRANT SELECT(where SalLimit) ON Emp TO User1, wherein User1 is a user granted permission to data in the table that satisfies SalLimit. Such statement can imply that User1 is allowed to see all rows in the Emp table that satisfies the SalLimit expression.

In absence of a granted security expression such as the example above, the data in a row cannot satisfy an expression and, thus, the user would not be provided with access to data in any row. In addition, any row that does not satisfy such conditions is rendered not visible to user. Moreover, where a deny security expression is satisfied, the user is prohibited from seeing the data.

As noted above, security can additionally be based on columns and/or tables. For example, the following statement can grant both row level and column level security.

GRANT SELECT(where SalLimit, Col1) On Emp TO User1, wherein the additional argument Col1 is utilized to specify a column within table Emp. Furthermore, there can be multiple grant, deny, and/or revoke statements on the same table. Typically, a deny statement supersedes a grant statement, however, the system can be configured alternatively. The grantee of such statements can be any principal authorized in the database system, for example, as defined by the specification.

Similarly, deny expressions for row, column and/or table level security, and revoke expressions to revoke a grant or deny are provided. An exemplary SQL deny syntax is depicted via the following:

DENY SELECT (WHERE <expression_name>) ON <data_name> TO (<user_name>), wherein <expression_name> specifies the security expression, <data_name> specifies a source data to evaluate against the security expression, and <user_name> specifies a user or user group to associate with the named security expression, and exemplary SQL revoke syntax is depicted via the following:

REVOKE SELECT (WHERE <expression_name>) ON <data_name> FROM (<user_name>), where <expression_name> specifies the security expression to revoke, <data_name> specifies a source data, and <user_name> specifies a user or user group to disassociate with the named security expression.

The data manager 110 can facilitate the query by applying the security expression against table data and only returning data that satisfies the expressions. As depicted, the query is performed over the database(s) 430, which comprises N tables, a table$_1$ 440$_1$, a table$_2$ 440$_2$ through a table$_N$ 440$_3$, wherein N is an integer greater than or equal to one, and data 450. It is noted the table$_1$ 440$_1$, table$_2$ 440$_2$, and table$_N$ 440$_3$ can be collectively referred to as tables 440. In general, the tables 440 can store data in structured format. Such structured format can include one or more sets of entities with similar structure, wherein respective entities can be referred to as rows and respective rows can be associated with fields that can be referred to as columns.

In general, a security expression can be considered as a named expression that behaves as a surrogate for essentially all rows that satisfy that expression. Thus, by utilizing this technique, one could express all rows in a table and/or respective rows when a primary key exists, for example. In addition, virtually any number of security expressions can be defined on a table, and a single row can be satisfied by more than one expression defined on the table. The foregoing provides a mechanism to cluster a set of rows with similar security characteristics and treat the set as a named expression.

Figure 5:
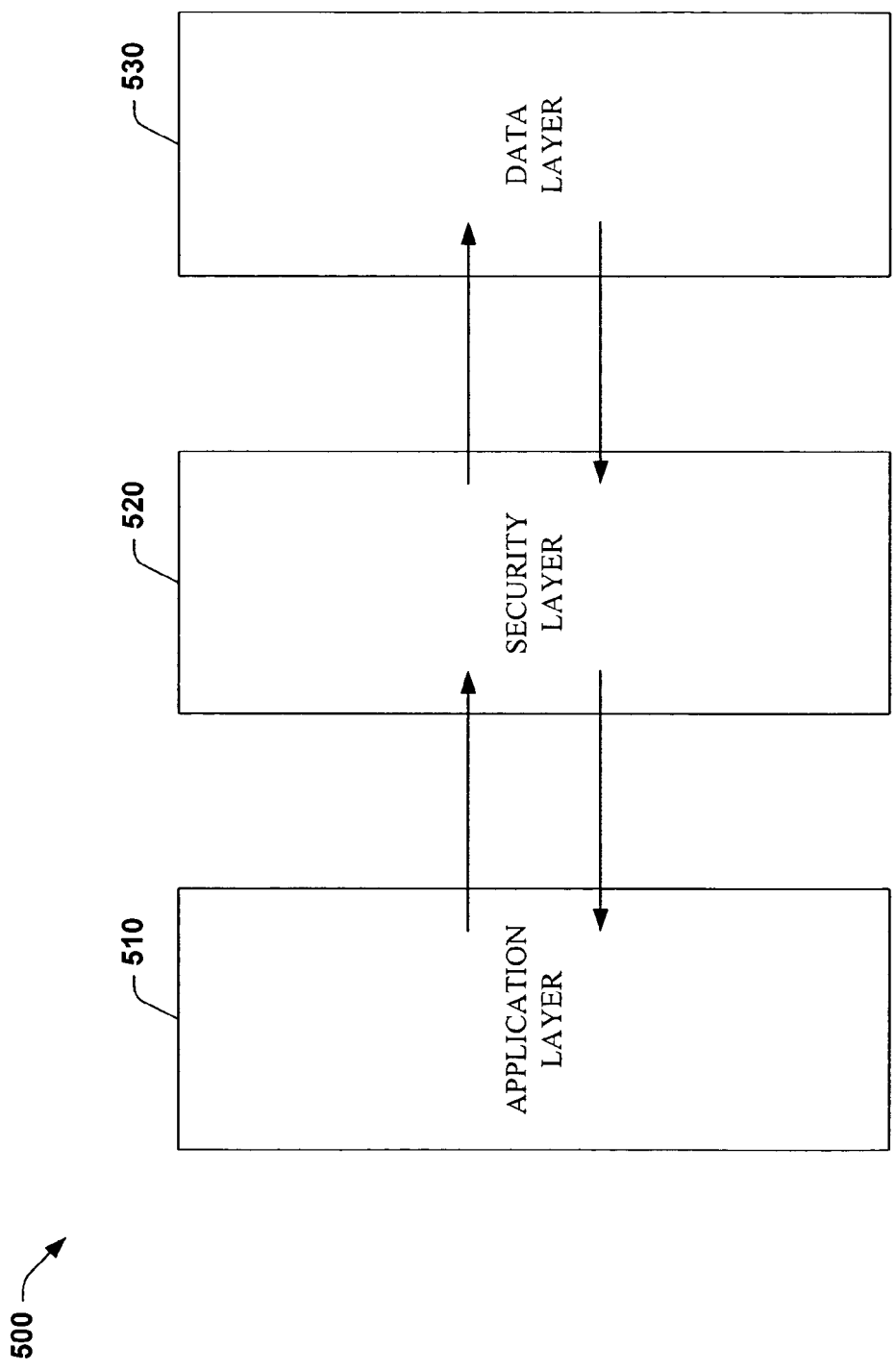
FIG. 5 illustrates an exemplary layered database security model.

FIG. 5 illustrates a data security model 500. The model 500 comprises an application layer 510, a security layer 520 and a data layer 530. The application layer 510 provides an interface between a user and the security layer 520. In one aspect of the present invention, the application layer 510 can be a user interface (e.g., a web browser) that can be employed by a user to initiate a query. Such interface can be a graphical user interface (GUI), command line interface and the like. For example, a GUI can be employed in connection with a search engine, wherein the GUI can provide the user a region or means to input search information, and include a region to present the results of the search. For example, the GUI can comprise known text and/or graphic regions comprising dialogue boxes, static controls, drop-down-menus, list boxes, pop-up menus, as edit controls, combo boxes, radio buttons, check boxes; push buttons, and graphic boxes.

In addition, utilities to facilitate the presentation such as vertical and/or horizontal scroll bars for navigation and toolbar buttons to determine whether a region will be viewable can be employed. For example, the user can provide search information via entering the information into an edit control. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt.

The user can interact with the regions to select and provide information via various devices such as a mouse, a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the invention is not so limited. For example, merely highlighting a check box can initiate information conveyance. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The security layer 520 provides an interface between the application layer 510 and the data layer 530, wherein security expressions can be created, stored, linked to users, and employed to evaluate data within the data layer 530 to determine whether requested data can be accessed by a user. As described above, security expressions can comprise one or more Boolean expressions created (e.g., via the SQL programming language) by an owner of data for the owner's data. Such expressions can be aggregated such that satisfying a security expression includes satisfying at least one grant expression and the complement of all deny expressions. In addition, one or more expressions can be created for one or more rows from one or more tables and linked to one or more users. The data layer 530 represents a region where data can be stored, searched and made available to a user employing the application layer 510 when an associated security expression is satisfied.

FIGS. 6-9 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

Figure 6:
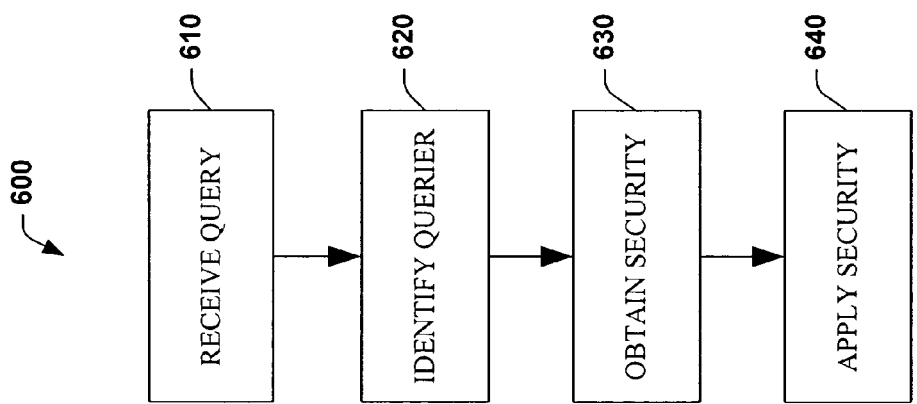
FIG. 6 illustrates an exemplary database security methodology for enabling row-level database security to provide secure row level access.

Proceeding to FIG. 6, a database security methodology 600. At reference numeral 610, a query initiated from essentially any database programming language such as SQL is received. Such query can be directed over a data repository comprising one or more databases, one or more tables, and various contextual information. At 620, user-identifying information is obtained such that the query can be associated with a user, user group, domain, network, etc. At 630, this information is utilized to obtain an associated security expression(s). For example, a data owner can create one or more security expressions and link them to one or more queriers. In addition, the data owner can edit and/or revoke linked security expressions. At 640, the data can be evaluated to determine which, if any, data satisfies the security expression(s). Typically, when security is not linked to a querier, the querier will not be able to see data where security has been activated. However, where a security expression has been linked to a querier, the querier generally will be able to access the data if the data satisfies at least one security expression that provides access to the data and does not satisfy any security that denies access to the data. A deny access security commonly supersedes a grant access so that when data satisfies both types of security, access is denied. In addition, both a grant and deny security can be revoked.

Figure 7:
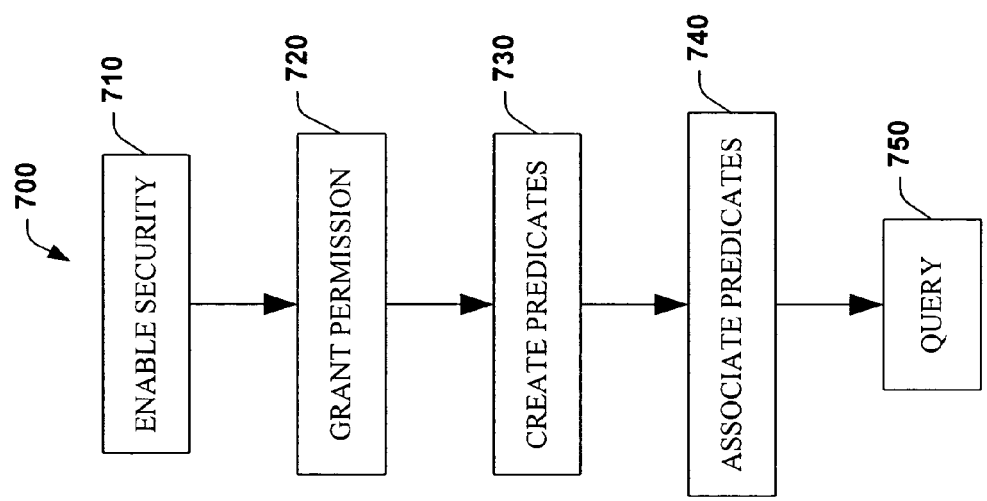
FIG. 7 illustrates a methodology for granting row-level security permission over table rows.

FIG. 7 illustrates a methodology 700 for enabling row-level database security in order to provide row level access. At reference numeral 710, row level security is enabled via the following SQL syntax: ALTER TABLE Orders SET ROW_SECURITY=ON. At 720, permission is granted to a user via a GRANT SELECT command. At 730, user restrictions are associated with the users through the CREATE EXPRESSION command. At 740, predicates are associated to relevant roles on one or more table through a GRANT "where" Statement. At 750, the predicates can be incorporated in the query and utilized during the query, wherein data that satisfies the expression (e.g., results in returning "true") is provided to the user. It is to be appreciated the a plurality of grant security expressions, as well as deny security expressions, as described herein, can be incorporated within a query and utilized during querying data.

Figure 8:
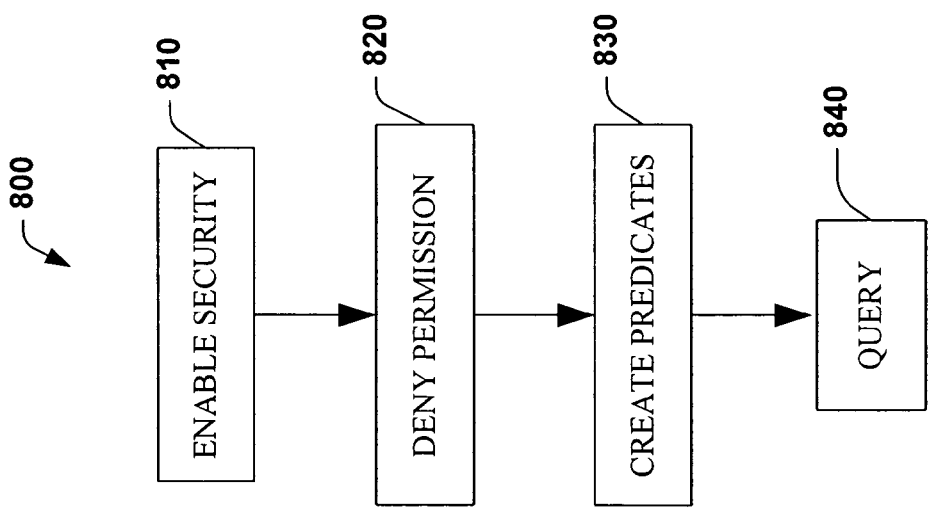
FIG. 8 illustrates a methodology for denying row-level security permission over table rows.

FIG. 8 illustrates a methodology 800 for enabling row-level database security in order to deny row level access. In general, a deny security expression supersedes a grant security expression such that a user will not be able to data that is associate with a grant and a deny expression and the data satisfies both expressions. Usually, the complement of the deny expression will be aggregated with the grant expression such that satisfying the aggregated expression provides access to the data. At reference numeral 810, row level security is enabled via the following SQL syntax: ALTER TABLE Orders SET ROW_SECURITY=ON. Typically, without activating row-level access, either none or the rows or all of the rows are accessible to users. At 820, permission is denied to a user via a DENY EXPRESSION command. At 830, predicates are associated to relevant roles on one or more table and incorporated in the query. At 840, the predicates are utilized while querying, wherein satisfying a deny expression results in returning a "false" for the security expression and the data is hidden from the user.

Figure 9:
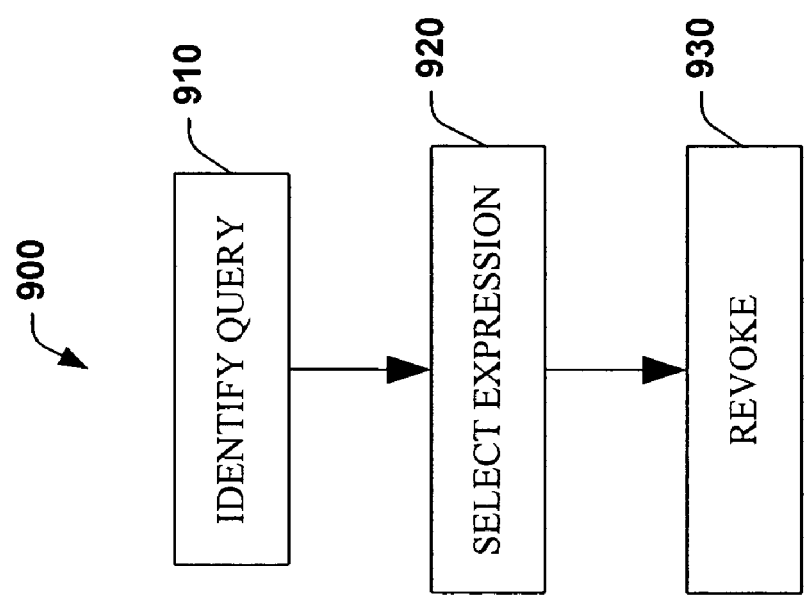
FIG. 9 illustrates a methodology for revoking grant and/or deny row-level security permission over table rows.

FIG. 9 illustrates a methodology 900 for revoking row-level database security. At reference numeral 910, a source of a received query is identified. At reference numeral 920, a security expression (e.g., a deny or grant) associated with the source is selected. As noted above, both grant and deny security expression can be associated with a user. For example, to grant a permission the GRANT EXPRESSION feature can be utilized and to deny a permission the DENY EXPRESSION feature can be utilized. At 930, the REVOKE command can be utilized to remove the grant and/or deny security expression to the user.

Figure 10:
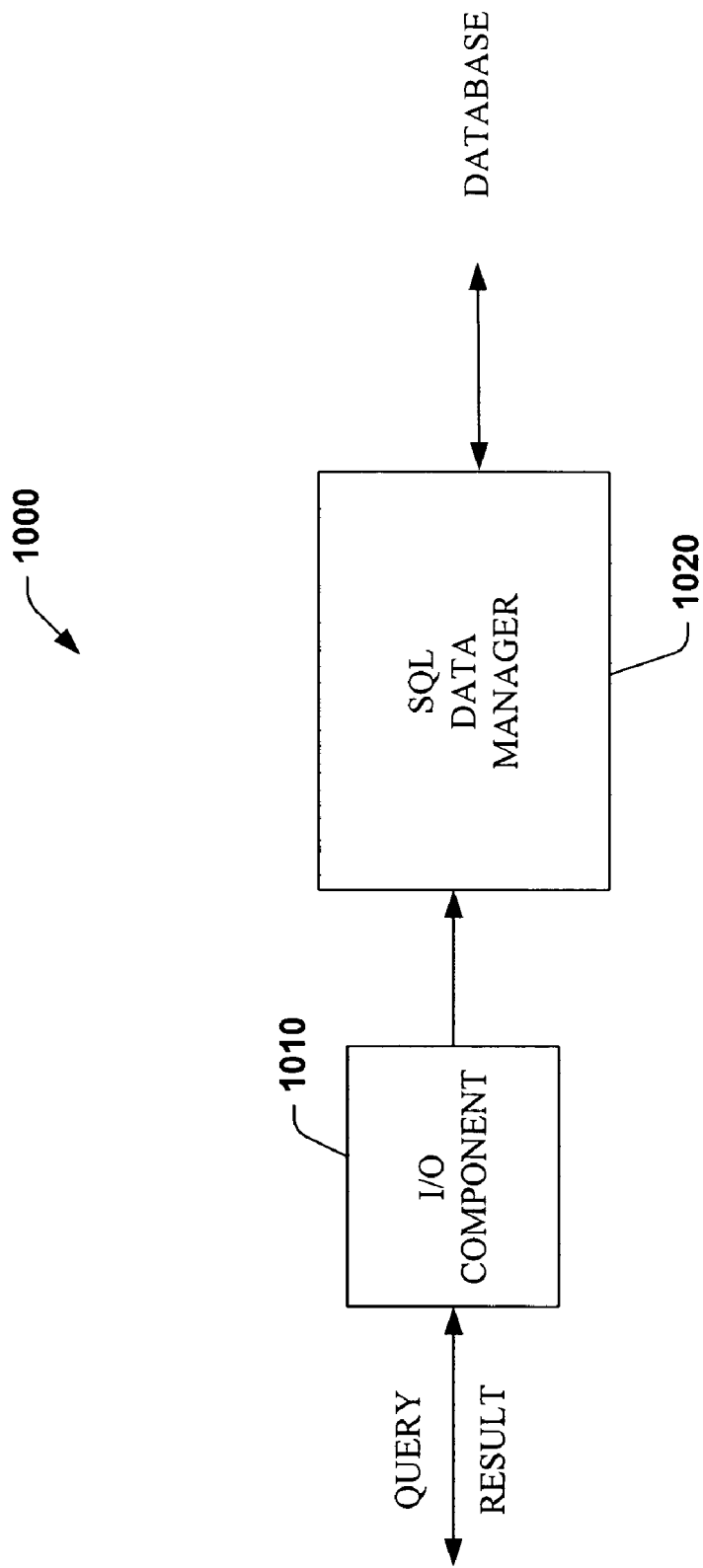
FIG. 10 illustrates an exemplary SQL query management system.

FIG. 10 illustrates an exemplary SQL query management system 1000. The SQL query management system 1000 comprises an I/O (input/output) component 1010 that accepts queries for data and a SQL data manager 1020 that associates and applies security expressions to data with a database. The system 1000 can utilize SQL utilities such as CREATE; DROP; GRANT; REVOKE; and DENY, to facilitate access control at the row level and are advantageous when employing, inter alia, a SELECT, an UPDATE, a DELETE, and/or an INSERT action on a table. The following provides exemplary CREATE; DROP; GRANT; REVOKE; and DENY syntax and corresponding explanations and examples and SELECT, UPDATE, DELETE and INSERT examples in accordance with an aspect of the present invention.

Predicates that are to be applied to a table to activate row-level access control (e.g., security) can be created using a DDL CREATE EXPRESSION. Such predicates can be given a name and applied to the table utilizing syntax (e.g., GDR) with the name of the expression.

Syntax:
CREATE EXPRESSION <expression_name> ON <table-name> AS (<expression>)

The CREATE utility can create on table <tablename> an expression as stipulated in <expression> and can assign it a name called <expression_name>.

Restrictions:
Sub-queries typically cannot be included
Function calls can be included if an expression comprises references to functions and the creator reference permissions on these functions
An expression should be given a name (expression_name)
The expression_name should be unique
Members of a db_ddladmin, a db_owner role, a sysadmin role, a table owner and users with FULL CONTROL permission at the database, schema and/or table level can have permission to create expressions on that table. In addition, users with ALTER ANY TABLE and/or ALTER on the table have permission to create an expression on the table.

Example

CREATE EXPRESSION My_Filter ON shipTable AS (ship_city='redmond' and order_num >35)

Predicates created using the CREATE EXPRESSION statement can subsequently be dropped using the DROP EXPRESSION statement.

Syntax:
DROP EXPRESSION <expression_name> ON <Table-name>

Restrictions:
An expression_name specified typically must already exist.

The current user typically needs to be a member of a db_ddladmin, a db_owner and/or a sysadmin role, an owner of the table on which the expression is identified, and/or have FULL CONTROL and/or ALTER permission on the table to drop the expression.

The expression generally can only be dropped if it is not currently being utilized for establishing row level security on a table.

If any restriction is violated, an error (e.g., "Expression may not exist or may be in use or you do not have permission to execute this statement") can be returned.

Exemplary GRANT Syntax:

```
GRANT
{
    ALL [ PRIVILEGES ]
    |
    [BEFORE | AFTER] permission [WHERE (<expression_name> [,...n]) [,...n ].
    }
    {
    [ ( column | [ ,...n ] )] ON { table | view }
    ON { table | view } [ ( column | [ ,...n ] )]
    ON { stored_procedure | extended_procedure }
        | ON { user_defined_function }
    }
    TO security_account [,...n ]
    [ WITH GRANT OPTION |
]
[ AS { group | role } ]
```

The UPDATE permission can be prefixed with a BEFORE or an AFTER. The BEFORE or AFTER typically can only be specified if row level security is being specified. In general, BEFORE implies that the predicate applies to the pre image of the row; security is based on the current values in the row. AFTER implies that the security is based on the post image; the values utilized to update the row. The <expression_name> is the name of the expression (e.g., created earlier via CREATE EXPRESSION syntax) that is utilized to initiate the security restrictions.

Restrictions:
A GRANT typically has to be on a table.
A permission typically applies at the table level.
A WITH GRANT OPTION typically will be allowed when specifying row level restrictions. Further grants generally can be made by the grantee on this expression.
<expression_name> typically must be a valid expression name that was already specified through the CREATE EXPRESSION statement.

A user issuing the GRANT typically needs to be the owner of the table or have full control permissions on the table or member of a db_owner, a db_securityadmin and/or a sysadmin role.

Example

GRANT SELECT WHERE (Myfilter) ON Table1 TO RedMgrs

GRANT BEFORE UPDATE WHERE (Filter2) ON Table2 TO public

Exemplary REVOKE Syntax:

```
REVOKE [ GRANT OPTION FOR ]
{
   ALL [ PRIVILEGES ]
   |
   [BEFORE | AFTER] permission [WHERE (<expression_
name> [,...n])[,...n ].
   }
   {
   [ ( column | [ ,...n ])] ON { table | view }
   | ON { table | view } [ ( column | [ ,...n ] ) ]
   | ON { stored_procedure | extended_procedure }
   | ON { user_defined_function }
   }
{ TO | FROM }
   security_account [ ,...n ]
[ CASCADE ]
[ AS { group | role } ]
```

REVOKE can be used to revoke a security permission that was already applied through a GRANT or a DENY.

Restrictions:

The <expression_name> typically must be a valid expression name already specified on the table using an earlier GRANT or DENY for the particular permission being revoked.

A column name or the expression being revoked typically can be specified.

A CASCADE option typically will apply for REVOKE's of expressions based GRANTS or DENYS. This typically will have to be the same expression specified in an earlier GRANT or DENY and a subset of rows defined by expressions already granted cannot be revoked.

For the REVOKE to succeed, the user typically needs to be a table owner or must have FULL CONTROL permissions on the table or a member of a db_securityadmin, a db_owner and/or a sysadmin role.

Example

REVOKE SELECT WHERE (MyFilter) ON Table1 TO RedMgrs

Exemplary DENY Syntax:

```
DENY
{
   ALL [ PRIVILEGES ]
   |
   [BEFORE | AFTER] permission [WHERE (<expression_
name> [,...n]) [,...n ].
   }
   {
   [ ( column | [ ,...n ] )] ON { table | view }
   | ON { table | view } [ ( column | [ ,...n ] )]
   | ON { stored_procedure | extended_procedure }
   | ON { user_defined _function }
```

```
   }
TO security_account [ ,...n ]
[ CASCADE ]
```

The <expression_name> is the name of the expression (created through an earlier CREATE EXPRESSION syntax) that is used to bring about the security restrictions.

Restrictions:

A DENY typically is on a table.

A permission typically applies at the table level.

The CASCADE option typically is allowed when specifying row level restrictions, and this will deny at the first level and revoke at lower levels the exact same expression if granted, but not any subset of it.

The <expression_name> typically must be a valid expression name already specified through the CREATE EXPRESSION statement.

A user issuing the DENY typically needs to be the owner of the table or member of the a db_owner, a db_securityadmin and/or a sysadmin role.

Example

DENY SELECT WHERE (MyFilter) ON Table1 TO BelvMgrs

These expressions can be included in a sysobjects object. In addition, a corresponding catalog view can reside in sys.objects. A table owner(s) and a user(s) with FULL CONTROL and/or VIEW DEFINITION permission can be able to see the expressions that are applied on the table.

When a query is issued against a table, it is augmented with predicates (e.g., one or more security expression) to invoke the necessary security restrictions. When a SELECT is issued against the table, the query is internally augmented with all the predicates that have been applied on the table by virtue of GRANT SELECT or DENY SELECT statements. When an UPDATE is issued against the table, the query is internally augmented with all the BEFORE and UPDATE predicates applied to the table by virtue of the GRANT/DENY, UPDATE For BEFORE and SELECT statements. For BEFORE UPDATES, the restrictions specified in the predicates are based on the current values in the rows and not the updated values. AFTER, UPDATE and INSERT restrictions behave like constraints; they act on the after image of the update. It is only possible to update rows that the user currently has access to select. When a DELETE is issued, the query is augmented with the predicates applied to the table by virtue of the GRANT/DENY SELECT and DELETE statements. The user can only delete rows currently selected. The security expressions defined on the table are applied before any other predicate is applied; user predicates are pushed below all the security predicates in the evaluation tree.

If there are multiple security predicates, the predicates specified in the GRANTS are ORed and the negative of respective predicates specified by virtue of DENY's are ANDed to these. In addition, table level or column level permissions can be set without row level security. With the introduction of row level security, the user has access to those rows with which explicit access has been granted. Thus, what a user sees in a particular table is an intersection of the column level and row level permissions. In order to allow for row level security, the table has to be marked as such. This can be done using the ROW_SECURITY flag in the CREATE/ALTER TABLE syntax (e.g., ALTER TABLE SET ROW_SECURITY=ON).

When the table has been enabled for row level security, the owner can determine whether row level security applies to certain individual rows. This can be done with predicates that grant access to one or more rows. The Exempt Row Security permission can also be utilized to achieve the same effect. This permission can ensure that none of the security predicates are applied to the query when the grantee issues one against the table, which achieves the effect of not applying row level security, as row level security is only applied through the predicates. The Exempt Row Security permission is also useful in that it allows the owner to selectively decide who should receive row level security. It is to be appreciated that predicates can be applied to the table at any time; however, these will only be augmented to queries of users that do not have the ExemptRowSec permission.

As noted above, it can be useful to grant certain users the ability to query the table without augmenting the query with the predicates. In addition, it can be useful to temporarily disable row level security without having to add, remove and/or alter some or all predicates. This can be done by granting the ExemptRowSec permission. Table Owners, members of the db_owner and sysadmin roles and users with CONTROL permission have this permission by default. For example, to exempt a user1 from row level security checks on a Table T, the following can be utilized:

GRANT ExemptRowSec ON T TO <user1>.

When this statement is issued, user1's queries to table T are not augmented with any predicates. This permission typically is granted at the table level and not at the column level.

Since predicates can include calls to functions that in turn call other tables that could also have predicates defined on them, it is important to trap cases where there may be a circular loop. For example, if Table T has a predicate defined on it that is essentially a call to function F, which in turn queries Table T and Table S, the predicates can be applied on Table S, but not the predicates on table T (because the latter would cause an endless loop otherwise), and, thus, trapping such cases of circular predicates, but only when the number of hops in the circle is less than n, but where n is the same number used to trap circular dependencies for views. In an audit trail, a privileged user can view an augmented query.

The following illustrates exemplary SQL CREATE TABLE and ALTER TABLE utilities.

Exemplary CREATE TABLE Syntax:

```
CREATE TABLE
    [ database_name.[ owner ] . | owner. ] table_name
    ( { < column_definition >
        | column_name AS computed_column_expression
        | < table_constraint > ::= [ CONSTRAINT constraint_name ] }
            [ { PRIMARY KEY | UNIQUE } [ ,...n ]
    )
[ ON {filegroup | DEFAULT } ]
[ TEXTIMAGE_ON {filegroup | DEFAULT } ]
[WITH ROW SECURITY = (ON | OFF)
< column_definition > ::= { column_name data_type }
    [ COLLATE < collation_name > ]
    [ [ DEFAULT constant_expression ]
        | [ IDENTITY [ ( seed, increment ) [ NOT FOR REPLICATION ] ] ]
```

-continued

```
    ]
    [ ROWGUIDCOL]
    [ < column_constraint > ] [ ...n ]
< column_constraint > :: = [ CONSTRAINT constraint_name ]
    { [ NULL | NOT NULL ]
        | [ { PRIMARY KEY | UNIQUE }
            [ CLUSTERED | NONCLUSTERED ]
            [ WITH FILLFACTOR = fillfactor ]
            [ON {filegroup | DEFAULT} ] ]
        ]
        | [ [ FOREIGN KEY ]
            REFERENCES ref_table [ ( ref_column ) ]
            [ ON DELETE { CASCADE | NO ACTION } ]
            [ ON UPDATE { CASCADE | NO ACTION } ]
            [ NOT FOR REPLICATION ]
        ]
        | CHECK [ NOT FOR REPLICATION ]
        ( logical_expression )
    }
        < table_constraint > ::= [ CONSTRAINT constraint_name ]
            { [ { PRIMARY KEY | UNIQUE }
                [ CLUSTERED | NONCLUSTERED ]
                { ( column [ ASC | DESC ] [ ,...n ] ) }
                [ WITH FILLFACTOR = fillfactor ]
                [ ON {filegroup | DEFAULT } ]
            ]
            | FOREIGN KEY
                [ ( column [ ,...n ] ) ]
                REFERENCES ref_table [ ( ref_column [ ,...n ] ) ]
                [ ON DELETE { CASCADE | NO ACTION } ]
                [ ON UPDATE { CASCADE | NO ACTION } ]
                [ NOT FOR REPLICATION ]
            | CHECK [NOT FOR REPLICATION ]
                ( search_conditions )
            }
```

Exemplary ALTER TABLE Syntax:

```
ALTER TABLE table
{ [ ALTER COLUMN column_name
    { new_data_type [ ( precision [ ,scale ] ) ]
        [ COLLATE < collation_name > ]
        [ NULL | NOT NULL ]
        | {ADD | DROP } ROWGUIDCOL }
    ]
    | ADD
        { [ < column_definition > ]
            | column_name AS computed_column_expression
        } [ ,...n ]
    | [ WITH CHECK | WITH NOCHECK ] ADD
        { < table_constraint > } [ ,...n ]
    | DROP
        { [ CONSTRAINT ]constraint_name
            | COLUMN column } [ ,...n ]
    | { CHECK | NOCHECK } CONSTRAINT
        { ALL | constraint_name [ ,...n ] }
    | { ENABLE | DISABLE } TRIGGER
        { ALL | trigger_name [ ,...n ] }
    | SET ROW SECURITY = (ON | OFF)
}
< column_definition > ::=
    { column_name data_type }
    [ [ DEFAULT constant_expression] [ WITH VALUES ]
        | [ IDENTITY [ ( seed,increment) [ NOT FOR REPLICATION ] ] ]
    ]
    [ ROWGUIDCOL ]
    [ COLLATE < collation_name > ]
    [ < column_constraint > ] [ ...n ]
< column_constraint > ::=
    [ CONSTRAINT constraint_name ]
    { [ NULL | NOT NULL ]
        | [ { PRIMARY KEY | UNIQUE }
            [ CLUSTERED | NONCLUSTERED ]
            [ WITH FILLFACTOR = fillfactor ]
            [ ON {filegroup | DEFAULT } ]
```

```
       ]
    | [ [ FOREIGN KEY ]
         REFERENCES ref_table [ ( ref_column ) ]
         [ ON DELETE { CASCADE | NO ACTION } ]
         [ ON UPDATE { CASCADE | NO ACTION } ]
         [ NOT FOR REPLICATION ]
       ]
    | CHECK [ NOT FOR REPLICATION ]
         ( logical_expression )
    }
< table_constraint > ::=
    [ CONSTRAINT constraint_name ]
    { [ { PRIMARY KEY | UNIQUE }
         [ CLUSTERED | NONCLUSTERED ]
         { ( column [ ,...n ] ) }
         [ WITH FILLFACTOR = fillfactor ]
         [ ON {filegroup | DEFAULT } ]
       ]
    |   FOREIGN KEY
         [ ( column [ ,...n ] ) ]
         REFERENCES ref_table [ ( ref_column [ ,...n ] ) ]
         [ ON DELETE { CASCADE | NO ACTION } ]
         [ ON UPDATE { CASCADE | NO ACTION } ]
         [ NOT FOR REPLICATION ]
    | DEFAULT constant_expression
         [ FOR column ] [ WITH VALUES ]
    |   CHECK [NOT FOR REPLICATION ]
         ( search_conditions )
    }
```

Table 1 and the following example are utilized to illustrate various exemplary aspects of the present invention.

TABLE 1

| OrderID | EmployeeID | OrderDate     | ShipCountry | ShipAddress | ShipcityCode |
|---------|------------|---------------|-------------|-------------|--------------|
| 123     | ABC123     | Apr. 3, 2002  | France      | Someaddr    | 67854        |
| 789     | EFG789     | Aug. 25, 2001 | Spain       | Someaddr    | 43674        |
| 456     | XYZ980     | Mar. 3, 2002  | Germany     | Someaddr    | 56373        |
| 234     | SGC007     | Jun. 7, 2001  | France      | Someaddr    | 67443        |
| 890     | RST678     | Apr. 4, 2002  | Spain       | Someaddr    | 43576        |

The goal of this example is to grant select to the Orders table with the following restrictions: Users who are members of the FranceMgr role can only see orders to that country; Users who are members of the SpainMgr role can only see orders to that country; and Users who are members of the Director role can see all rows.

Row level security for Table 1 is enabled via the following: ALTER TABLE Orders SET ROW_SECURITY=ON. Permission is granted to a Director, FranceMgr and SpainMgr, respectively through the following: GRANT SELECT ON Orders TO directors; GRANT SELECT ON Orders TO FranceMgr; and GRANT SELECT ON Orders TO SpainMgr. Restrictions are associated with the Director, FranceMgr and SpainMgr, respectively, through the following: CREATE EXPRESSION SeeAll ON Orders AS 1=1; CREATE EXPRESSION SpainFilter ON Orders AS (Orders.ShipCountry='Spain'); and CREATE EXPRESSION FranceFilter ON Orders AS (Orders.ShipCountry='France'). Predicates are associated to relevant roles on the Orders table through the following: GRANT SELECT ON Orders TO Directors Where SeeAll; GRANT SELECT WHERE (SpainFilter) ON Orders to SpainMgrs; and GRANT SELECT WHERE (FranceFilter) ON Orders to FanceMgrs. Alternatively, Grant ExemptRowSec to Directors can be utilized to exempt members of the Directors role from any augmenting of row level predicates, so when the member of the Directors role queries the table the query is not augmented with any of the predicates.

The predicates can be queried, wherein the following predicates are associated with the table: Directors; SpainFilter; and FranceFilter. At the time of querying, the query can be augmented with the above predicates, such that an original query defined by SELECT * FROM Orders is augmented to SELECT * FROM Orders WHERE ((IS_MEMBER('Directors')=1 AND 1=1) OR (IS_MEMBER('SpainMgrs')=1 AND Orders.Shipcountry='Spain') OR (IS_MEMBER ('FranceMgrs')=1 AND Orders.Shipcountry='France')).

This augmented query will bring about the security restrictions required. So now, if a member of the Directors, FranceMgrs or SpainMgrs role were to perform the following query she would get only those Orders that were placed after Jan. 1, 2002 AND where the ship Country was any country, France and Spain, respectively.

Original query:

SELECT * FROM ORDERS

WHERE OrderDate >'Jan. 1, 2002.

```
Augmented query:
SELECT * FROM ORDERS
WHERE OrderDate> '1/1/02'
AND
(
(IS_MEMBER('Director') = 1 AND 1 = 1)
OR
(IS_MEMBER('SpainMgrs') = 1 AND Orders.Shipcountry = 'Spain')
OR
(IS_MEMBER('FranceMgrs') = 1 AND Orders.Shipcountry = 'France')
)
```

Figure 11:
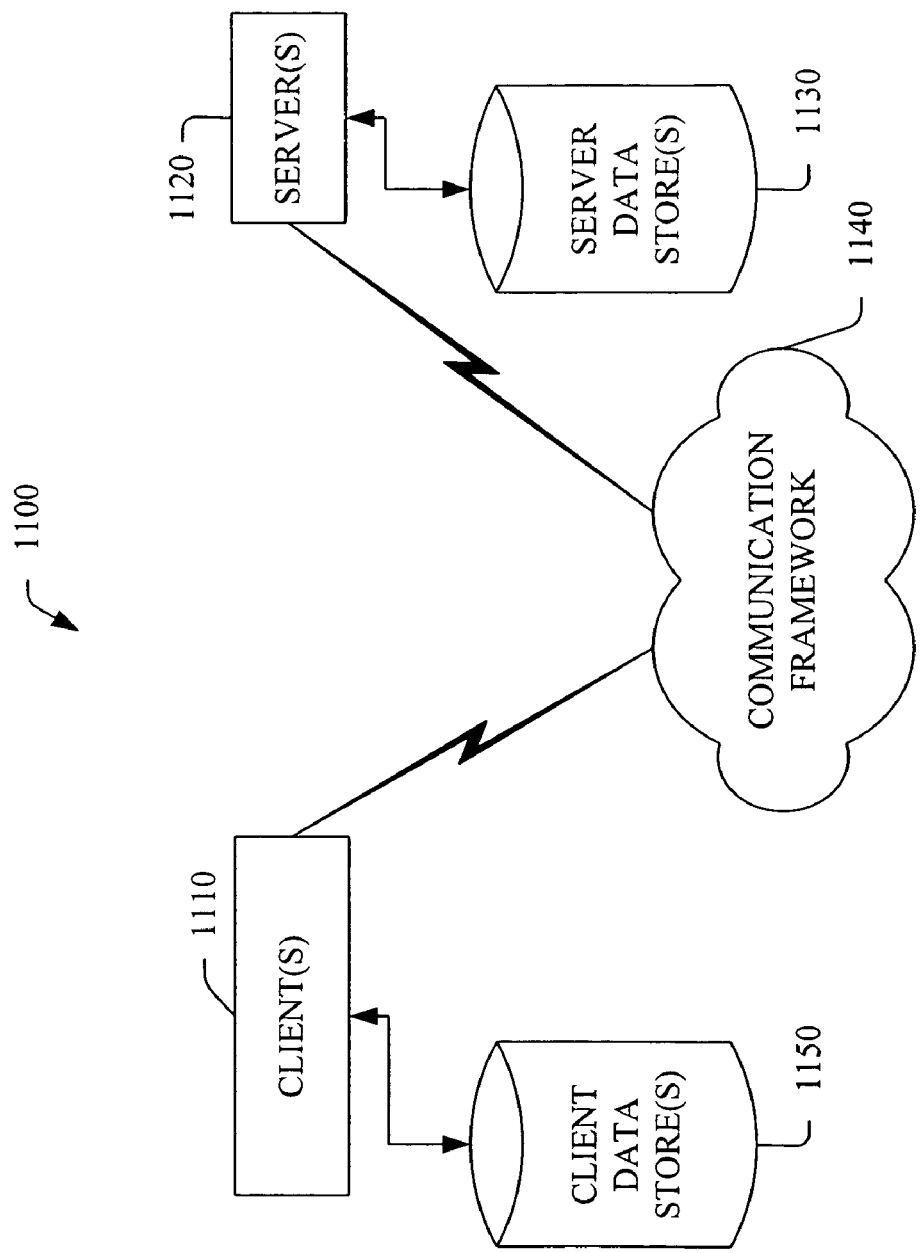
FIG. 11 illustrates an exemplary networking environment, wherein the novel aspects of the present invention can be employed.
Figure 12:
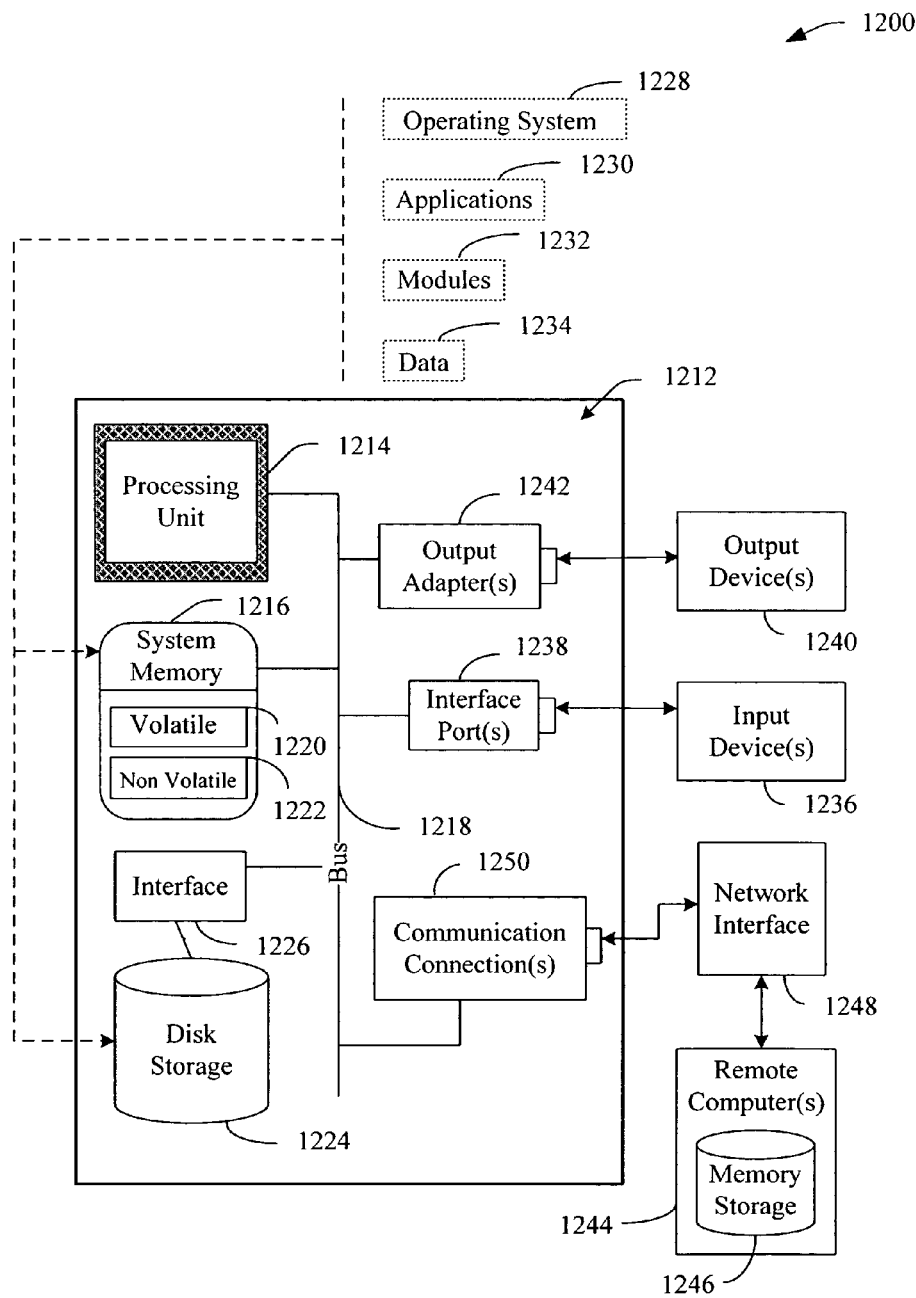
FIG. 12 illustrates an exemplary operating environment, wherein the novel aspects of the present invention can be employed.

In order to provide additional context for implementing various aspects of the present invention, FIGS. 11-12 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the present invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s)

1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on computer-readable storage medium that when executed on one or more processors facilitates row-level database security, comprising:
   a component that utilizes an enhanced structured query language (SQL) programming language to create a plurality of row-level security expressions for one or more rows of data, wherein at least two row-level security expressions are created for the same row of data, the component associates one of the two row-level security expressions with a selected user, and wherein an SQL GRANT or DENY utility is utilized to associate the row-level security expression with the user, the GRANT utility utilized to associate a security expression with the user that provides access to row data when the row data satisfies the security expression and the DENY utility utilized to associate a security expression with the user that prohibits access to row data when the row data satisfies the security expression; and
   a data management component that utilizes at least one security expression to evaluate a queried row of data, wherein the at least one security expression is invoked based on the identity of the query initiator, and the row of data is made accessible to the query initiator only when the row satisfies the at least one security expression,
   wherein the GRANT utility employs a syntax including at least an expression name, a column name, a data name and a user name, where the expression name specifies a name of the security expression associated with the GRANT utility, the column name specifies a column to evaluate against the security expression associated with the GRANT utility, the data name specifies a source data to evaluate against the security expression associated with the GRANT utility, and the user name specifies a user or user group to associate with the security expression associated with the GRANT utility,
   wherein the DENY utility employs a syntax including at least an expression name, a data name and a user name, where the expression name specifies a name of the security expression associated with the DENY utility, the data name specifies a source data to evaluate against the security expression associated with the DENY utility, and the user name specifies a user or user group to associate with the security expression associated with the DENY utility.

2. The system of claim 1, the row-level security expression is a named expression that clusters one or more sets of row data that have similar security characteristics.

3. The system of claim 1, the row-level security expression is a Boolean expression defined over but not restricted to column data and contextual data.

4. The system of claim 1, the row of data is returned to the user when the data therein evaluates to "true" when evaluated with the row-level security expression.

5. The system of claim 1, the row of data is hidden from the user when the data therein evaluates to "false" when evaluated with the row-level security expression.

6. The system of claim 1, the row-level security expression further specifies column-level security.

7. The system of claim 1, the row-level security expression satisfies two or more rows of data.

8. The system of claim 1, a plurality of security expressions satisfies the same row of data.

9. The system of claim 1, an SQL CREATE utility is utilized to create the row-level security expression.

10. The system of claim 1, a plurality of row-level security expressions are aggregated to evaluate to "true" when at least one security expression that grants access to the row of data is satisfied and no security expressions that deny access to the row of data are satisfied.

11. The system of claim 1, an administrator of a row of data creates and associates security expressions for the row of data.

12. A database security system comprising computer-executable components embodied on computer-readable storage media that when executed on one or more processors facilitates database security, comprising:

a component that employs an enhanced structured query language (SQL) to create a plurality of named security expressions that cluster one or more rows of data having similar row level security characteristics, wherein at least two named security expressions are created for the same row of data, the component associates one of the two named security expressions with a query initiator, wherein an SQL GRANT or DENY utility is utilized to associate the row-level security expression with the query initiator, the GRANT utility utilized to associate a security expression with the query initiator that provides access to row data when the row data satisfies the security expression and the DENY utility utilized to associate a security expression with the query initiator that prohibits access to row data when the row data satisfies the security expression;

an analysis component that searches a repository of data and evaluates rows of data therein based on the row level security characteristics; and a presentation component that returns only the rows of data that satisfy security expression associated with the query initiator, wherein the GRANT utility employs a syntax including at least an expression name, a data name and a user name, where the expression name specifies a name of the security expression associated with the GRANT utility, the data name specifies a source data to evaluate against the security expression associated with the GRANT utility, and the user name specifies a user or user group to associate with the security expression associated with the GRANT utility, wherein the DENY utility employs a syntax including at least an expression name, a data name and a user name, where the expression name specifies a name of the security expression associated with the DENY utility, the data name specifies a source data to evaluate against the security expression associated with the DENY utility, and the user name specifies a user or user group to associate with the security expression associated with the DENY utility.

13. The system of claim 12, the one or more rows of data is clustered through a named security expression.

14. The system of claim 13, the named security expression comprises at least one Boolean expression.

15. The system of claim 13, an SQL CREATE utility is employed to create the named security expression via the following syntax:
CREATE EXPRESSION <expression_name> ON <data_name> AS (<expression>),
where <expression_name> specifies a name for the security expression, <data_name> specifies a source data to evaluate against the security expression, and <expression> defines a security expression.

16. The system of claim 14, an SQL REVOKE utility is employed to revoke the named security expression from the query initiator via the following syntax:
REVOKE SELECT (WHERE <expression_name>) ON <data_name> FROM (<user_name>),
where <expression_name> specifies a name of the security expression to revoke, <data_name> specifies a source data the security expression is being severed from, and <user_name> specifies a user or user group to disassociate with the named security expression.

17. A method that provides row-level database security, comprising:

employing a processor executing computer-executable instructions stored on a computer-readable storage medium to implement the following acts:

creating a plurality of security expressions that specify at least row level database security, wherein at least two row level security expressions are created for the same row of data;

associating one of the two security expressions for the same row of data with one or more users via enhanced structured query language (SQL), wherein an SQL GRANT or DENY utility is utilized to associate the row-level security expression with the one or more users, the GRANT utility utilized to associate a security expression with the one or more users that provides access to row data when the row data satisfies the security expression and the DENY utility utilized to associate a security expression with the one or more users that prohibits access to row data when the row data satisfies the security expression;

employing the security expression associated with the one or more users in connection with handling a query received from the one or more users;

returning only such data to the one or more users that satisfies the security expression when a GRANT utility was used to association the expression with the user; and denying the one or more users access to data that satisfies the security expression when a DENY utility was used to associate the expression with the one or more user, wherein the GRANT utility employs a syntax including at least an expression name, a data name and a user name, where the expression name specifies a name of the security expression associated with the GRANT utility, the data name specifies a source data to evaluate against the security expression associated with the GRANT utility, and the user name specifies a user or user group to associate with the security expression associated with the GRANT utility, wherein the DENY utility employs a syntax including at least an expression name, a data name and a user name, where the expression name specifies a name of the security expression associated with the DENY utility, the data name specifies a source data to evaluate against the security expression associated with the DENY utility, and the user name specifies a user or user group to associate with the security expression associated with the DENY utility.

18. The method of claim 17, further comprising combining a plurality of row-level security expressions to form an aggregated security expression that evaluates to "true" for data that satisfies the aggregated expression.

19. The method of claim 17, further comprising specifying at least one of column level or table level security in the security expression.

20. The method of claim 17, the security expression is a Boolean expression defined over but not restricted to column data and contextual data.

21. The method of claim 17, further comprising utilizing SQL extensions to create the security expression and associate the security expression with the user.

22. A method that applies SQL-based row-level database security, comprising:

employing a processor executing computer-executable instructions stored on a computer-readable storage medium to implement the following acts:

creating a plurality of row level security expressions for one or more rows of data, wherein at least two of the row level security expressions are created for the same row of data;

associating one of the two row level security expressions with a user using at least one of an SQL GRANT or DENY utility, wherein the GRANT utility is utilized to associate a security expression with the user that provides access to row data when the row data satisfies the security expression and employs the following syntax:

GRANT SELECT (WHERE <expression name>, <column name>) ON <data name> TO (<user name>), where <expression name> specifies a name of the security expression, <column name> specifies a column to evaluate against the security expression, <data name> specifies a source data to evaluate against the security expression, and <user name> specifies a user or user group to associate with the named security expression, and the DENY utility is utilized to associate a security expression with the user that prohibits access to row data when the row data satisfies the security expression and employs the following syntax:

DENY SELECT (WHERE <expression name>) ON <data name> TO (<user name>), where <expression name> specifies a name of the security expression, <data name> specifies a source data to evaluate against the security expression, and <user name> specifies a user or user group to associate with the named security expression;

receiving a query;

identifying the query initiator;

obtaining security expressions associated with the query initiator; and utilizing the security expressions to selectively provide the query initiator with access to rows of data by granting access to rows of data that satisfy security expressions that were associated using the GRANT utility, and by denying access to rows of data that satisfy security expressions that were associated using the DENY utility.

23. The method of claim 22, further comprising incorporating the security expressions in the query.

24. A computer readable storage medium storing computer executable components that when executed on one or more processors facilitate row-level database security, comprising:

a component that creates a plurality of row-level security expressions, wherein at least two row-level security expressions are created for the same row of data;

a component that associates a first of the two row-level security expressions with a first user and associates a second of the two row-level security expressions with a second user, wherein an SQL GRANT or DENY utility is utilized to perform the associations, the GRANT utility employed to associate each security expression with the respective users such that the user is allowed access to row data when the row data satisfies the associated security expression, and the DENY utility employed to associate each security expression with the respective users such that the user is denied access to row data when the row data satisfies the associated security expression;

a component that combines a query with at least one row-level security expression associated with the initiator of the query using the SQL GRANT or DENY utility; and a component that queries data based on the query and the at least one associated row-level security expression, wherein row data that satisfies the query and the at least one associated row-level security expression is returned to the initiator of the query when a GRANT utility was used to associate the security expression, and row data that satisfies the query and the at least one associated row-level security expression is not returned to the initiator of the query when a DENY utility was used to associate the security expression wherein the GRANT utility employs a syntax including at least an expression name, a data name and a user name, where the expression name specifies a name of the security expression associated with the GRANT utility, the data name specifies a source data to evaluate against the security expression associated with the GRANT utility, and the user name specifies a user or user group to associate with the security expression associated with the GRANT utility, wherein the DENY utility employs a syntax including at least an expression name, a data name and a user name, where the expression name specifies a name of the security expression associated with the DENY utility, the data name specifies a source data to evaluate against the security expression associated with the DENY utility, and the user name specifies a user or user group to associate with the security expression associated with the DENY utility.

25. A database security system embodied on computer-readable storage media that when executed on one or more processors facilitates row-level database security, comprising:

means for creating a plurality of row-level security expressions, wherein at least two row-level security expressions are created for the same row of data;

means for associating one of the two row-level security expressions with one or more query initiators using structured query language (SQL), wherein an SQL GRANT or DENY utility is utilized to associate the row-level security expression with the one or more query initiators, the GRANT utility utilized to associate a security expression with the one or more query initiators that provides access to row data when the row data satisfies the security expression and the DENY utility utilized to associate a security expression with the one or more query initiators that prohibits access to row data when the row data satisfies the security expression; and means for evaluating rows of data with the row-level security expression when a query is received by the one or more query initiators, wherein only rows of data that satisfy the row-level security expression are provided to the one or more query initiators wherein the GRANT utility employs a syntax including at least an expression name, a data name and a user name, where the expression name specifies a name of the security expression associated with the GRANT utility, the data name specifies a source data to evaluate against the security expression associated with the GRANT utility, and the user name specifies a user or user group to associate with the security expression associated with the GRANT utility, wherein the DENY utility employs a syntax including at least an expression name, a data name and a user name, where the expression name specifies a name of the security expression associated with the DENY utility, the data name specifies a source data to evaluate against the security expression associated with the DENY utility, and the user name specifies a user or user group to associate with the security expression associated with the DENY utility.

* * * * *